United States Patent [19]

Meyers

[11] Patent Number: 5,433,960
[45] Date of Patent: Jul. 18, 1995

[54] CHEWING GUM INCLUDING AGENT CONTAINING EDIBLE FILM

[75] Inventor: Marc Meyers, Naperville, Ill.

[73] Assignee: Wm. Wrigley Jr. Company, Chicago, Ill.

[21] Appl. No.: 49,814

[22] Filed: Apr. 20, 1993

Related U.S. Application Data

[63] Continuation-in-part of Ser. No. 871,962, Apr. 21, 1992.

[51] Int. Cl.⁶ ............................................. A23G 3/30
[52] U.S. Cl. ........................................ 426/5; 426/302; 426/306; 426/307; 426/310
[58] Field of Search ........................................ 426/3–6, 426/96, 99, 302, 306, 310, 307

[56] References Cited

U.S. PATENT DOCUMENTS

| | | | |
|---|---|---|---|
| 4,105,801 | 8/1978 | Dogliotti | 426/99 |
| 4,117,173 | 9/1978 | Schiweck et al. | 426/548 |
| 4,127,677 | 11/1978 | Fronczkowski et al. | 426/5 |
| 4,146,653 | 3/1979 | Mader et al. | 427/3 |
| 4,224,219 | 9/1980 | Van Blanton et al. | 260/211 G |
| 4,317,838 | 3/1982 | Cherukuri et al. | 426/5 |
| 4,323,588 | 4/1982 | Vink et al. | 426/564 |
| 4,359,531 | 11/1982 | Bucke et al. | 435/97 |
| 4,423,086 | 12/1983 | Devos et al. | 427/3 |
| 4,562,076 | 12/1985 | Arnold et al. | 426/5 |
| 4,567,053 | 1/1986 | Lindley | 426/538 |
| 4,568,560 | 2/1986 | Schobel | 427/3 |
| 4,587,119 | 5/1986 | Bucke et al. | 424/48 |
| 4,661,359 | 4/1987 | Seaborne et al. | 426/89 |
| 4,681,766 | 6/1987 | Huzinec et al. | 426/5 |
| 4,693,974 | 9/1987 | Schwengers et al. | 435/97 |
| 4,777,046 | 11/1988 | Iwakura et al. | 424/435 |
| 4,786,511 | 11/1988 | Huzinec et al. | 426/5 |
| 4,792,453 | 12/1988 | Reed et al. | 426/5 |
| 4,802,924 | 2/1989 | Woznicki et al. | 427/3 |
| 4,810,524 | 3/1989 | Seaborne et al. | 427/384 |
| 4,822,622 | 4/1989 | Dokuzovic et al. | 426/5 |
| 4,824,680 | 4/1989 | Bernatz et al. | 426/3 |
| 4,828,845 | 5/1989 | Zamudio-Tena et al. | 426/5 |
| 4,885,175 | 12/1989 | Zibell | 426/5 |
| 4,915,971 | 4/1990 | Fennema et al. | 426/578 |
| 4,931,294 | 6/1990 | Yatka et al. | 426/3 |
| 4,961,935 | 10/1990 | Cherukuri et al. | 426/3 |
| 4,976,972 | 12/1990 | Patel et al. | 426/3 |
| 4,978,537 | 12/1990 | Song | 426/5 |
| 5,048,260 | 9/1991 | Raymond et al. | 53/370.8 |
| 5,089,307 | 2/1992 | Ninomiya et al. | 428/35.2 |
| 5,108,762 | 4/1992 | Broderick et al. | 426/5 |
| 5,124,160 | 4/1992 | Zibell et al. | 426/3 |
| 5,128,155 | 7/1992 | Song et al. | 426/5 |
| 5,130,150 | 7/1992 | Averbach | 426/99 |
| 5,130,151 | 7/1992 | Averbach | 426/99 |
| 5,139,787 | 8/1992 | Broderick et al. | 424/48 |
| 5,165,944 | 11/1992 | Song et al. | 426/5 |

FOREIGN PATENT DOCUMENTS

| | | |
|---|---|---|
| 0273000 | 6/1988 | European Pat. Off. . |
| 0298768 | 1/1989 | European Pat. Off. . |
| 0328849 | 8/1989 | European Pat. Off. . |
| 3043914A1 | 6/1981 | Germany . |
| WO86/00501 | 1/1986 | WIPO . |
| WO87/03453 | 6/1987 | WIPO . |
| WO87/07902 | 12/1987 | WIPO . |
| WO89/03170 | 4/1989 | WIPO . |
| WO90/06061 | 6/1990 | WIPO . |
| WO90/07864 | 7/1990 | WIPO . |
| WO90/13994 | 11/1990 | WIPO . |
| WO91/03147 | 3/1991 | WIPO . |

OTHER PUBLICATIONS

Brochure: "Palatinit Infopac", Sussungsmittel GmbH (1984).

Primary Examiner—Jeanette Hunter
Attorney, Agent, or Firm—Hill, Steadman & Simpson

[57] ABSTRACT

Improved chewing gums and methods for manufacturing same. A chewing gum is provided comprising an edible film having sufficient barrier properties to provide the chewing gum with increased moisture stability at ambient conditions than a chewing gum without the edible film, the edible film including at least one active chewing gum agent.

29 Claims, 11 Drawing Sheets

COMPARISON OF WAX COATING
LEVELS ON BARRIER PERFORMANCE
(WITH 0.9 MIL/SIDE HPMC PRE-COAT)

BEESWAX

— CNTRL 1    + CNTRL 2    * CNTRL 3    -□- 0.9 MIL
-*- 1.65 MIL    -◇- 2.0 MIL    -△- 3.0 MIL (COATING THICKNESS IN MILS PER EACH SIDE OF THE STICK)
ACCEL. AGED 58% RH /85F

| CNTRL 1 = PRODUCTION |
| CNTRL 2 = ROLLING COMPD. REMOVED |
| CNTRL 3 = HPMC ONLY (NO WAX ON CNTRL 2) |

COMPARISON OF WAX COATING LEVELS ON BARRIER PERFORMANCE
(WITH 0.9 MIL/SIDE HPMC PRE-COAT)

BESQUARE 185

— CNTRL1  + CNTRL2  ⋯∗⋯ CNTRL3  —□— 0.65 MIL
—✕— 1.1 MIL  —◇— 1.65 MIL  —△— 2.0 MIL  —✶— 3.1 MIL (COATING THICKNESS IN MILS PER EACH SIDE OF THE STICK)
ACCEL. AGED 58% RH/85F

CNTRL 1 = PRODUCTION
CNTRL 2 = ROLLING COMPD REMOVED
CNTRL 3 HPMC ONLY (NO WAX ON CNTRL2)

COMPARISON OF WAX COATING
LEVELS ON BARRIER PERFORMANCE
(NO HPMC PRE-COAT)

BESQUARE 185

COMPARISON OF WAX COATING
LEVELS ON BARRIER PERFORMANCE
(PREPARED VS. UNPREPARED GUM)

VARIOUS COATINGS

— CNTRL 1           + CNTRL 2
—✕— 1.1 VIC/1.1 HPMC-UNPD    —◇— 1.1 VIC/0.9 HPMC PRP (COATING THICKNESS IN MILS PER EACH SIDE OF THE STICK)

ACCEL. AGED 58% RH /85F

| CNTRL1 = PRODUCTION |
| CNTRL2 = ROLLING COMP'D. REMOVED |

COMPARISON OF WAX COATING LEVELS ON BARRIER PERFORMANCE
(PREPARED VS. UNPREPARED GUM)

COMPARISON OF WAX COATING LEVELS ON BARRIER PERFORMANCE
(PREPARED VS. UNPREPARED GUM)

CHEWING GUM INCLUDING AGENT CONTAINING EDIBLE FILM

This is a continuation-in-part of U.S. patent application Ser. No. 07/871,962, filed on Apr. 21, 1992.

BACKGROUND OF THE INVENTION

The present invention relates generally to chewing gum and methods of manufacturing same.

During storage, chewing gum has a tendency to lose or gain moisture from the surrounding atmosphere depending on the surrounding temperature, relative humidity, and packaging, and also depending on the shape and formulation of the chewing gum. Sugar-containing chewing gums, for instance, typically contain corn syrup and a small amount of humectant such as aqueous sorbitol or glycerin. Such sugar-containing chewing gums have a tendency to dry out and become brittle when stored under relatively dry conditions of 50% relative humidity and lower. The tendency of sugar gums to dry out and become brittle is particularly apparent at higher ambient temperatures.

Sugarless chewing gums are typically designed to contain lower amounts of moisture than sugar-containing gums. In sugarless gums which are sweetened with aspartame or other moisture-susceptible artificial sweeteners, it is important to maintain a low moisture content in order to prevent loss of sweetness and flavor qualities. However, due to their low initial moisture content and high level of hygroscopic ingredients, these sugarless gums tend to gain moisture at above 40% relative humidity, causing wetness of the chewing gum and degradation of the aspartame or other moisture-susceptible artificial ingredients.

Various technologies have been developed for the purpose of protecting chewing gum from moisture loss, moisture gain and other adverse changes which result from storage. For example, packaging techniques have been developed which provide sealed, high quality protective packaging for individual chewing gum sticks. One such technique is disclosed in U.S. Pat. No. 5,048,260 to Raymond et al.

Other techniques of protecting chewing gum from adverse environmental conditions have involved modifying the chewing gum formulae so as to encapsulate or otherwise protect the individual chewing gum ingredients which are environmentally susceptible. U.S. Pat. No. 4,822,622 to Dokuzovic et al. discloses the use of a protective barrier film through the center of a chewing gum to separate a flavor-containing chewing gum layer from an aspartame-containing chewing gum layer. The barrier film components which are disclosed include gelatin, acacia gum, agar, algin and derivatives, carrageenan and salts thereof, arabinogalactan, baker yeast, glycan, carboxymethylcellulose, carob bean gum, cellulose gum, furcellaran and salts thereof, guar gum, gum arabic, hydroxypropyl cellulose, hydroxypropyl methyl cellulose, Irish moss gelose, karaya gum, locust bean gum, methylcellulose, methylethyl cellulose, pectin, propylene glycol alginate, propylene glycol ether of methylcellulose, sodium carboxy methylcellulose, tragacanth gum, xanthan gum, shellac, and mixtures thereof.

U.S. Pat. No. 4,568,560 discloses a method for encapsulating active ingredients in a coating composition comprising a water soluble film forming composition, an enteric compound and a plasticizer for the film forming composition. U.S. Pat. No. 4,824,680 to Bernatz et al. discloses a method for producing a sugar-based chewing gum having improved wrapability.

Still other techniques of protecting chewing gum from adverse environmental conditions have involved coating the chewing gum with an edible film. Most of these techniques have focussed on the film coating of chewing gum tablets and other confectionery tablets, as opposed to chewing gum sticks. U.S. Pat. No. 4,802,924 and PCT Publication WO 87/07902 disclose the coating of pharmaceutical tablets, foods, confectionery forms and the like with polydextrose, or a combination of polydextrose and cellulosic polymer, or a layer of polydextrose overcoated by a layer of cellulosic polymer. German Patent No. DE 3,043,914 discloses the coating of pharmaceuticals, confectionery products and foods, with an edible film containing methyl cellulose, hydroxypropyl methyl cellulose, hydroxypropyl cellulose, cellulose acetate phthalate, ethyl cellulose, polyvinyl pyrrolidone, sodium ethyl cellulose sulfate, corn protein (zein), and/or poly (vinyl acetate phthalate).

U.S. Pat. No. 4,810,534 to Seaborne et al. discloses a method for preparing a low water permeable, edible film containing cross-linked shellac and one or more edible sources of polyphenolics, benzaldehyde and derivatives, acetylated monoglycerides, polyglycerol esters, straight chain monocarboxylic acid and dicarboxylic acids. U.S. Pat. No. 4,777,046 to Iwakura et al. discloses a sheet-like preparation comprising a drug, a gelatin or agar, gluten, a carboxyvinyl polymer, a polyhydric alcohol, a gum, a wax and a sheet-like support. PCT Publications WO 87/03453 and WO 86/00501 both disclose methods of preparing preformed edible films which include a layer of a hydrophilic polymer selected from the group consisting of edible, film-forming carbohydrates and proteins, and a lipid layer adhered to the hydrophilic layer.

A number of possible "active agents" in gum either are incompatible with other ingredients in gum or react therewith. Sweeteners and flavor are examples of active agents that can adversely interact with other ingredients. Aspartame, for example, is sensitive to at least certain aldehyde flavors, as well as moisture. Due to this characteristic, aspartame cannot be used with certain ingredients or, for example, must be segregated in the gum by a protective barrier layer from other components as discussed above. See U.S. Pat. No. 4,822,622.

In a similar vein, certain ingredients, when used at least in certain gum compositions, do not necessarily exhibit their desired properties. For example, in certain gum formulations, the sweetener thaumatin can become bound up in the gum and therefore is not readily released to produce desired sweetness. Additionally, for certain ingredients, the release rate from the body of the chewing gum may be poor requiring extra ingredients or higher use levels in order to provide sufficient sensory perception.

With respect to active agents in gum, a further issue that arises is with respect to stability during storage. For example, it is known to use flavors in chewing gum. However, at least with respect to certain flavors, the flavors dissipate (evaporate) from the gum. Thus, the chewing gums can lose flavor over time.

In manufacturing gum, another issue is with respect to processing. In order to process chewing gum sticks in an efficient manner, it is desirable that the chewing gum sticks be as rigid as possible. However, this is contrasted with the desire to have soft chewing gum for the user to chew.

In order to improve manufacturing processes, rolling compounds are used. Rolling compounds include sugar, starch, and mannitol. Aside from providing some initial sensory impact, the rolling compound increases the processability of the chewing gum, as well as prevents the chewing gum compositions from binding to the machinery. Additionally, the rolling compound assists in the sheeting and wrapping of the chewing gum.

However, rolling compounds adversely effect chewing gum processing machinery and increase wear. Although it would be desirable to not use a rolling compound, this creates manufacturing problems.

SUMMARY OF THE INVENTION

The present invention provides improved chewing gums and methods for manufacturing same. Pursuant to the present invention, by locating at least one active agent in an edible film that coats the chewing gum, improved properties can be achieved.

To this end, the present invention provides a chewing gum comprising an edible film having sufficient barrier properties to provide the chewing gum with increased moisture stability at ambient conditions than a chewing gum without the edible film, the edible film including at least one active chewing gum agent.

In an embodiment, the active chewing gum agent is a sweetener.

In an embodiment, the active chewing gum agent is a flavor.

In an embodiment, the active chewing gum agent is a dental agent.

In an embodiment, the active chewing gum agent is a softener.

In an embodiment, the active chewing gum agent is an antioxidant.

In an embodiment, the active chewing gum agent is a flavor enhancer.

In an embodiment, the active chewing gum agent is water.

In an embodiment, the active chewing gum agent is a slip agent.

In an embodiment, the active chewing gum agent is a color.

In an embodiment of the method, the coating of edible material includes an edible film forming agent chosen from the group consisting of: cellulose derivatives; modified starch; dextrin; gelatin; zein; protein; maltodextrins; polyols; low calorie bulking agents; vegetable gums; shellac; edible polymer films; and combinations thereof.

In an embodiment of the method, the coating of edible material comprises: a first layer of an edible film; and a second layer of a material chosen from the group consisting of: wax, lipids, fatty acids, fats, oils, and hydrocarbon polymer type waxes.

In an embodiment of the method, the coating of edible material is an emulsion including at least two materials chosen from the group consisting of: carbohydrates; modified carbohydrates; carbohydrate derivatives, including celluloses, gums, and gum derivatives; proteins; and lipids including waxes, oils, fats, and lipid fatty acid derivatives.

In an embodiment, the emulsion is chosen from the group consisting of: pseudolatexes; colloidal dispersions; ethylcellulose emulsions; and wax emulsions.

In an embodiment, a stick chewing gum is provided comprising an edible film that provides sufficient barrier properties to the stick chewing gum to provide the stick chewing gum with increased moisture stability at ambient conditions than a chewing gum without the edible film and at least one active agent chosen from the group consisting of: sweeteners; flavors; dental agents; softeners; antioxidants; flavor enhancers; water; colors; and slip agents, being located within the film.

The present invention also provides, in an embodiment, a method for manufacturing chewing gum comprising the steps of: creating a unit of chewing gum; coating the unit of chewing gum with an edible film that provides barrier properties; and locating in the edible film at least one active chewing gum agent chosen from the group consisting of: sweeteners; flavor; dental agents; softeners; antioxidants; flavor enhancers; water; colors; and slip agents.

In an embodiment, the unit is a stick of chewing gum. In a further embodiment, the stick of chewing gum includes a first and second side and the first and second sides are both coated with the edible film. Further, in an embodiment, the active agent is present in the film on only the first or the second side of the chewing gum stick.

Additionally, in an embodiment, a method for segregating ingredients in a chewing gum is provided comprising the steps of: creating a chewing gum structure; and coating the chewing gum structure with an edible film that includes one or more ingredients that interact with one or more ingredients of the chewing gum structure.

It is an advantage of the present invention to provide an improved chewing gum composition and methods for making same.

Another advantage of the present invention is to provide a chewing gum composition wherein the release rate of the flavor is improved.

Still further, an advantage of the present invention is to provide a chewing gum composition that allows a more varied use of sweeteners and allows for the control of release of the sweeteners in the chewing gum.

Moreover, an advantage of the present invention is to provide a chewing gum composition that allows the use of certain sweeteners that heretofore could not easily be used in chewing gum compositions.

Furthermore, an advantage of the present invention is that it provides a chewing gum composition that allows dental agents to be used at a surface of the chewing gum and allows for the control of release in the chewing gum.

Another advantage of the present invention is that it provides a chewing gum composition wherein flavor enhancers can be used in an improved manner.

Moreover, an advantage of the present invention is that it provides a chewing gum composition wherein colors can be used without interaction with other gum ingredients.

A still further advantage of the present invention is that it provides a chewing gum composition that can be more rigid providing better processability. However, the chewing gum will soften when chewed by the consumer.

Further, an advantage of the present invention is to provide a chewing gum composition that can be constructed so as to create predefined reactions when chewed.

Furthermore, an advantage of the present invention is to provide a means for segregating ingredients of chewing gum prior to use by the consumer.

Moreover, an advantage of the present invention is to provide a chewing gum composition that has improved processability.

Another advantage of the present invention is to provide a chewing gum composition that does not require a rolling or dusting compound.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
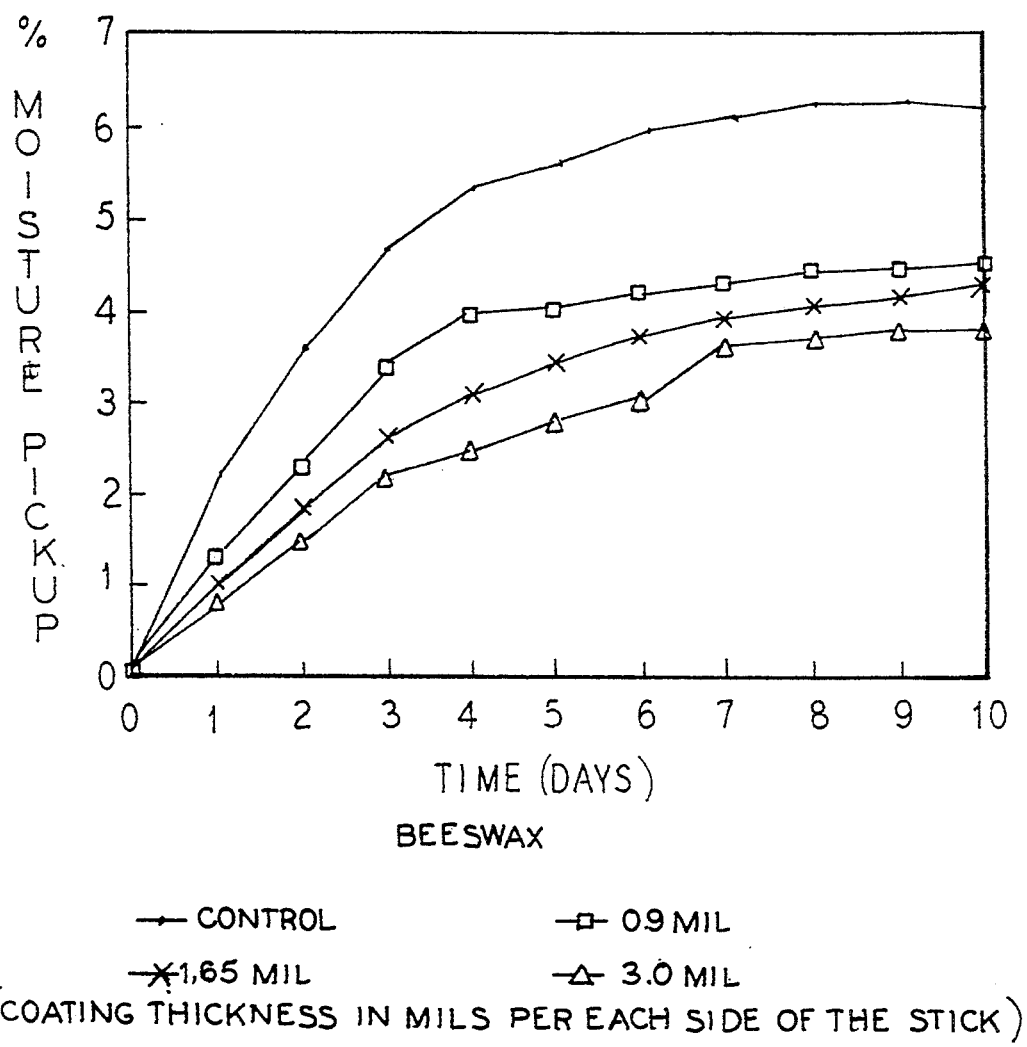
FIG. 1 illustrates the weight gain as a function of time for chewing gum sticks coated on both sides with 0.9 mils (wet) of aqueous hydroxypropyl methylcellulose (HPMC) and beeswax, for different thicknesses of wax coating, at 58% relative humidity and 85° F.

Pursuant to the present invention, improved chewing gum compositions are provided. To this end, the chewing gum is coated by an edible material, that provides barrier properties, that includes an active agent. By locating an active agent in the edible material that coats the gum, improved characteristics can be provided to the chewing gum.

Pursuant to the present invention, the chewing gum piece is coated with an edible material that provides moisture barrier properties. This coating may comprise: a multilayer coating of two or more materials (e.g., a layer of edible film and a layer of wax); a single layer of material (e.g., a layer of only edible film); or an emulsion of two or more materials. A variety of different coatings are possible pursuant to the present invention.

What is important is that the chewing gum with the coating of edible material is more moisture stable at ambient conditions than it would be without the coating. As used herein, "edible material" includes any material that does not have to be removed from the chewing gum before it is chewed, i.e., a material that can be chewed and ingested by the consumer.

In accordance with the invention, in an embodiment, a chewing gum composition is provided which has been manufactured and sheeted according to procedures well known in the art. The chewing gum sheet is coated on one surface using an aqueous solution of an edible, water soluble film forming agent. The edible, water soluble film forming agents which are presently contemplated for use with the invention include: cellulose derivatives; modified starch; maltodextrin; polyols; low calorie bulking agents such as indigestible dextrans, oligofructoses, and polydextrose; dextrin; gelatin; zein; gluten; soy protein; whey protein; edible polymers; edible plastics; and vegetable gums including guar gum, locust bean gum, carrageenan gum, acacia, karaya, ghatti, tragacanth, tamarind gum, agar, alginates, pectin and xanthan gum. However, it is expected that any edible water-soluble film forming agent which exhibits adhesive characteristics after being partially dried, can be used.

In an embodiment, the preferred water soluble film forming agents are cellulose derivatives. These include ethyl cellulose, hydroxypropyl methyl cellulose, methyl cellulose and sodium hydroxymethyl cellulose. Of these, the most preferred water soluble film forming agent is hydroxypropyl methylcellulose (HPMC).

The water soluble film forming agent can be used in an aqueous solution which includes about 5 to about 25 weight percent water soluble film forming agent. In an embodiment, preferably, the aqueous solution includes about 10 to about 20 weight percent water soluble film forming agent, most preferably about 13 weight percent. A commercially available food grade HPMC which is particularly suitable for use in the invention is Methocel E5 available from the Dow Chemical Co., Midland, Mich. A plasticizer may be mixed with the HPMC in order to improve flexibility of the film.

The solution of film forming agent can be applied using a variety of techniques including: co-extrusion; off-set printing-direct roller contact; electrostatic spraying; high-pressure air spraying; pressurized porous roller; vibratory feeder (powder); non-contact off-set printing—doctor blade to remove film from roller; wick (pressure fed brush); auger (powder); enrober equipment; and extrude film and laminate to gum.

For example, the film forming agent can be applied using spraying equipment which is capable of spraying a fine mist of the solution. An example of suitable spraying equipment is the Nordson Model 64B airless sprayer, available from Nordson Corp., Amherst, Ohio.

If a spraying technique is used, during spraying, the spraying nozzle should be about 10 inches or slightly less above the chewing gum surface. In an embodiment, a sufficient amount of the aqueous solution should be applied to give a wet coating thickness of about 0.25 to about 1.5 mils, preferably about 0.7 to about 1.2 mils, most preferably about 1.0 mils.

Assuming a rolling or dusting compound is used, it may be desirable to remove any rolling or dusting compound present on the surface of the chewing gum sheet, before applying the aqueous solution of edible film forming agent. Removal of the dusting compound is not always necessary or beneficial, but may be necessary in instances where the edible film forming agent is applied as a relatively thin coating, or is otherwise easy to crack during or after drying. Removal of much of the dusting compound can be accomplished by applying a dry cloth to the surface of the chewing gum sheet, followed by a damp cloth. During production, the rolling compound may alternatively be removed using a brush, vacuum, or other suitable technique.

In an embodiment, after the aqueous solution of edible film forming agent has been applied, the solution is allowed to dry partially or until the coating becomes tacky and can no longer flow. The coating should not be so dry that its adhesive properties are lost, or so wet that its adhesive properties are not apparent. The drying is preferably accomplished over a short period of time of about 30 seconds to about two minutes, depending on the wet thickness of the coating. If desired, the drying can be aided by the use of a forced air blower, using air that is heated to a temperature of no greater than about 120° F.

Depending on the barrier properties of the edible film forming agent, it may be desirable to coat the edible film with another material. To this end, in an embodiment, after the aqueous solution of edible film forming agent has been partially dried to a paste or glue, a layer of wax or other composition can be applied over the edible film forming agent. The types of waxes which are suitable for use with the invention include: natural waxes such as beeswax and carnauba wax; candelilla wax; microcrystalline waxes such as Victory wax, Besquare wax and Star wax; and paraffin waxes. Of these, the preferred wax is beeswax. However, it is envisioned that other components having wax-like properties can be used such as lipids including fatty acids, fats, oils, and hydrocarbon polymer type waxes.

Likewise, as previously stated, if desired, the wax, lipid, and fat and oil derivatives, depending on manufacturing issues and barrier properties, may be used alone as the edible material without the edible film material discussed above.

In a similar vein, an emulsion of ingredients can be used and coated on the gum. For example, pseudolatexes, colloidal dispersions, ethylcellulose emulsions, and wax emulsions can be used. In an embodiment of the method, the coating of edible material is an emulsion including at least two materials chosen from the group consisting of: carbohydrates; modified carbohydrates; carbohydrate derivatives, including celluloses, gums, and gum derivatives; proteins; and lipids including waxes, oils, fats, and lipid fatty acid derivatives.

Indeed, a great number of ingredients are envisioned for use as the edible film. These include, without limitation: latex-type emulsions, ethylcellulose emulsions; polyvinyl acetate; polyethylene; edible plastic films; sorbitan esters; polyoxyethylene sorbitan esters; glycol esters/polyethylene glycol esters; ethoxylated esters; glycerol esters/polyglycerol esters; bacterial cellulose fiber; microparticulated cellulose; cellulose derivatives; sodium alginate, propylene glycol alginate, etc. for gelling with calcium chloride salt; zein solutions; alcoholic shellac; pullulan, cellulosics pre-casted films with plasticizers; cellulosics films with alcohol and stearic acid, beeswax, refined paraffin wax, hydrogenated palm oil, PEG (polyethylene glycol), lauric acid, palmitic acid, arachidic acid, oleic/linoleic, linolenic acids, eladic acid, carnauba wax, candelilla wax, rice bran wax, and microcrystalline wax; protein films based on gluten, gliadin glutenin or zein; chitosan/chitin; lecithin; ionization of lipid droplets to attach to gum surface; cocoa butter, chocolate; silicon oxides (syloid) $SiO_2$ or $CaSiO_3$; $MgSiO_3$; calcium carbonate; calcium sulfate; high amylose starch; sugarcane wax; cocoa wax; montan wax; flax and cotton seed wax; vegetable wax/vegetable oil suspension, including coconut oil, palm kernel oil, soybean oil, corn oil, sesame oil, safflower oil, cottonseed oil, and a combination of above products; mineral oil; oxidized polyethylene; medium chain triglycerides; zein/alcohol solution; sugar esters; extruded cellulosics with PEG; purified shellac with citric acid; preformed films of cellulose derivatives; pullulan, etc.; other protein film formers; acetylated monoglycerides; triacetin, tristearin; magnesium stearate; palm oil, palm kernel oil, transhardened veg. oil, cocoa butter, fractionated veg. oil, hydrog. palm kernel stearine.

If wax is used, the wax is preferably applied to the molten state in order to facilitate uniformity of application and adhesion, but can alternatively be applied as a powder and pressed and optionally heated to melt the wax. An example of equipment which is suitable for applying the wax is the Nordson Model 2302 hot melt wax spray applicator, equipped with an H20T spray gum with a cross-cut nozzle, available from the Nordson Corp., Amherst, Ohio.

If a spraying process is used, during spraying, the spraying nozzle should be about one inch above the chewing gum surface, in order to ensure that the wax remains molten until after contacting the previously applied coating of edible film forming agent. In an embodiment, a sufficient amount of the wax should be applied to give a wax coating thickness of about 0.5 to about 3.0 mils, preferably about 0.7 to about 2.0 mils, most preferably, about 1.0 mil. The thickness of the wax coating does not change significantly as the wax hardens to a solid.

In an embodiment, after the wax has hardened, then the entire coating process is repeated on the opposite surface of the chewing gum sheet. Alternatively, both sides of the gum can be coated simultaneously. After both sides of the chewing gum sheet have been coated, the chewing gum can be scored, cut into sticks and wrapped. In an alternative embodiment, the chewing gum can be scored and cut into sticks before one or both surfaces have been coated.

A chewing gum composition generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including, but not limited to, sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include, but are not limited to, sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include, but are not limited to, sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets, scoring and cutting into sticks. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further, parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

Pursuant to the present invention, at least one or more active agents is located in the edible film. As used herein, the term "active agents" refers to a component of the chewing gum that adds a desirable characteristic or performs a necessary function in the chewing gum composition. Accordingly, active agents include, without limitation, sweeteners, flavor, dental agents, softeners, antioxidants, flavor enhancers, water, colors, and slip agents. One or more of these agents is present in the edible film to provide improved characteristics to the chewing gum.

For example, sweeteners can be located in the edible film. Examples of sweeteners that can be located in the edible film include: aspartame, alitame, sucralose, salts of acesulfame, saccharine and its salts, cyclamic acid and its salts, glycyrrhizin, dihydrochalcones, thaumatin, and combinations thereof.

By locating the sweeteners in the edible film, advantages can be achieved over conventional chewing gum compositions. High intensity sweeteners can be applied on the surface to improve impact and to act as a protective layer when in contact with other gum ingredients (i.e., flavor, moisture, acid). Likewise, for certain sweeteners that become bound in gum (e.g. thaumatin) and are not efficiently released, the sweetener can be located in the film for optimum impact. For example, by locating aspartame on the edible film, aspartame would be more stable with respect to moisture and flavors in the gum. Additionally, by locating aspartame in the edible film this would increase the initial sweetness perception while using less sweetener overall.

By way of example, and not limitation, examples of sweeteners in the edible film are as follows. Thaumatin can be added in an amount of 0.5% (by weight) to a 10-20% HPMC (hydroxypropyl methyl cellulose) solution to create a film. The film is then coated on chewing gum sticks. The coating is dried. The film, and thereby chewing gum stick, is then coated with molten beeswax. This film coating will add about 20 ppm thaumatin to the gum formula via the coating and add improved flavor and sweetness to the chewing gum.

Another example of a sweetener in a film includes adding 0.3% APM in a buffered solution via an aqueous carrier solution (HPMC, maltodextrin, other hydrocolloids, zein, and the like). Stable sweeteners (e.g., sucralose, thaumatin) can be applied at equivalent levels by being mixed into waxes, polymers (used in gum, or polyethylene, etc.) and other hydrophobic (fats/oils) materials. If desired, the stable sweetener can also be dissolved into hydrophilic carriers, such as HPMC, maltodextrin, other hydrocolloids, zein, and the like. The sweeteners can also be incorporated in an emulsion. Emulsions can be made comprising 10-40% of a sweetener solution that is emulsified with a hydrophobic material (fat, triglycerides) and the use of a surfactant (HPMC, gum arabic, other hydrocolloids, lecithin, etc.) at 0.5-5%.

Likewise, flavor can be located in the edible film. Examples of flavor that can be located in the edible film include: citrus oils, light fruit esters, peppermint oil, spearmint oil, and other mint oils, clove oil, oil of wintergreen, anise, artificial flavors, and other sensorially acceptable flavor blends. By locating the flavor in the edible film, additionally, an advantageous chewing gum can be achieved. For example, by locating light fruit esters in an emulsion in the edible film, improved flavor impact with greater intensity and shelf life can be achieved.

By way of example, and not limitation, an example of an edible film including the flavor is as follows. An emulsion of 30% (by weight) gum arabic (acacia) with 2% (by weight) of a mint flavor and 0.5% (by weight) lecithin is prepared. The composition is then sprayed onto stick chewing gum as an edible film. After the edible film coating has dried molten beeswax may be coated thereover. Initial flavor impact of the resulting chewing gum will be higher than samples without flavor on the surface. Also, by binding the flavor onto the edible film, improved shelf life stability can be obtained.

Additionally, as noted above, dental agents can be located in the edible film. Examples of dental agents that can be located in the edible film include: plaque pH buffers and inhibitors, phosphates, minerals, antimicrobial agents, microbial inhibitors, sodium bicarbonate, and remineralizing agents such as calcium glycerophosphate.

By locating a dental agent in the edible film, certain advantages are achieved. For example, by locating sodium bicarbonate in the edible film, quicker buffering capacity can be achieved at much lower usage levels than required when they are located within the gum.

By way of example, and not limitation, an example of a chewing gum composition including a dental agent in the edible film is as follows. A 15% gelatin solution in water can be prepared and to it is added 5% calcium phosphate. This will produce a 20% solution of a 3/1 ratio of gelatin/calcium phosphate in water. This material can be spray coated onto a chewing gum stick and dried. Molten carnauba wax may then be sprayed onto the sticks to obtain an edible film with an active dental agent.

Flavor enhancers can be located in the film. Flavor enhancers include acidulants, salt, MSG (monosodium glutamate), and 5'-nucleotides. An advantage of locating flavor enhancers in the film is enhanced flavor impact at lower flavor usage levels of both the flavor and enhancer compound than when mixed into gum.

Softeners can be located in the edible film. Examples of softeners that can be located in the edible film include: lecithin, glycerol monostearate, triacetin, acetylated monoglycerides, polyol and glycol esters, polyglycerol esters, fat, oils, and lipids.

An advantage of locating a softener in the edible film is to improve processing of the same allowing softer chew characteristics to the chewing gum. Initially, chewing gum may be constructed that would be more rigid than typical conventional chewing gum, but then when the chewing gum is chewed, the softener is released to obtain a softer chew. Softeners and plasticizers are also used to plasticize a film to obtain better film properties and thus give improved moisture protection to the gum.

Softeners can be applied on the surface, in the film, so that they will not adversely affect the gum mixing, sheeting, or wrapping operations, but will provide softening when chewed. Also, softness can be delivered for up front impact in aged gums that may have become hardened over time. Softeners tend to be hydrophobic and may interact with flavors or other ingredients to change their stability and/or release character. By putting the softener on surface, this can be prevented.

Examples of an edible film including a softener are as follows. An aqueous ethylcellulose film sold under the tradename Aquacoat, by FMC Corp. of Philadelphia, Pa. can be used to coat gum sticks. To this material a plasticizer triacetin is added so that a resultant 5/1 ratio of Aquacoat/triacetin is achieved. This material may be used to coat stick gum as an edible film and dried. No further wax coating may be needed. At this level of triacetin, the softener should give a much softer texture during chewing.

Additionally, triacetin, lecithin, mono and diglycerides, and the like from 0.1-2% can be added alone, dissolved into wax or another hydrophobic carrier and applied onto the surface. Softeners can also be made in an emulsion as described above (3) with hydrophilic carriers.

Likewise, water, or other sources of moisture can be located in the edible film and function as a softener. By locating water in the edible film, it is possible to initially construct the chewing gum so that it is more rigid than typical conventional chewing gum. This improves processability.

However, due to the water located in the edible film, when the chewing gum is chewed by the user, it becomes soft. Therefore, although a rigid chewing gum is initially presented, and provides improved processability, the chewing gum will soften when chewed by the user, therefore providing a viable chewing gum.

An example of an edible film including a water component is as follows. A 13% HPMC solution in water is used to prepare the edible film. The solution is applied to the chewing gum. When the film is dried to a slightly tacky surface, there is significant water still available to act as a softener for the chewing gum.

Additionally, in order to improve wear and tear on chewing gum processing machines and prevent dusting problems, it may be desirable not to use a rolling compound. Pursuant to the present invention, a rolling compound can be avoided by locating a slip agent in the edible film.

By locating the slip agent in the edible film, one will still be able to achieve processing through the chewing gum machine. However, in contrast to a rolling or dusting compound, wear and tear on the chewing gum machine will not be a factor.

Examples of slip agents that can be included in the edible film include: silicone and its derivatives, stearates, high melting point waxes, silicon dioxide, talc, and polymer slip agents.

Slip agents can help improve efficiency in producing or wrapping gum. Wrapping averages may be increased by using a slip agent in the film. Slip agents in the film may also be more effective and less costly than current sugar/mannitol rolling compounds in terms of maintenance and sanitary costs in the factory.

Examples of an edible film including a slip agent are as follows. A zein alcohol solution can be made at about a 25% solids level. This material can be applied to stick gum as an edible film and dried to remove the alcohol. To this is added a blend of carnauba wax and talc at a 1/1 ratio to obtain a smooth sliding surface for stick gum. Slip agents can be applied alone or in combination with hydrophilic components (HPMC, etc.) or hydrophobic components (wax, fats, oils), depending on their solubility. Silicon at 10–95% of the coating would effectively lower friction on the gum surface.

Additionally, colors can be located in the edible film. Examples of colors that can be located in the edible film include: synthetic dyes and lake, pigments, whiteners, and natural food colorants.

By locating a color in the edible film, certain advantages are achieved. For example, by locating FD&C red #3 dye in the edible film, the dye which is not acid stable will be more stable on the gum surface in gums that contain acids to produce tartness.

By way of example, and not limitation, an example of a chewing gum composition including a color in the edible film is as follows: To a 13% HPMC water solution is added 0.01% FD&C red #3 dye. The solution can then be applied to the chewing gum as the edible film. The FD&C red #3 lake color can also be blended with molten beeswax at a ratio of 1/100 color/wax and applied to the gum to obtain a red colored edible film.

Of course, a number of other active agents can be included in the edible film. Such active agents can include: emulsifiers, acidulants, salts, antioxidants, and colors.

By way of example, and not limitation, contemplative examples of emulsion based edible films having active agents are as follows:

Emulsified flavors, softeners and slip agents can be created to change stability and release rates. The resultant emulsions can then be coated onto a stick of chewing gum.

Flavor and gum arabic or other hydrocolloids could be emulsified as is or with other ingredients (e.g., zein, maltodextrin) and applied at 0.1–2.0% flavor on a gum weight basis. Flavor impact up front will be improved; and flavor potency over shelf life will be higher than traditional flavored rolling compounds.

Zein emulsions, ethocel emulsions, and emulsions with polymers (PVAC, PE, etc.) can be made by high temperature, high shear conditions in water. Very fine particles can be dispersed into the water to form emulsions. 10–40% can be added to the water. Aquacoat by FMC and Colorcons (ethocel dispersion) are existing emulsions currently commercially available that can be used with an active agent to create films pursuant to the present invention.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1–11 (GENERAL PROCEDURE)

The following chewing gum formulation was prepared for use in a variety of trials described hereinafter in the Examples:

| Component | Weight Percent |
| --- | --- |
| Gum Base | 24.4 |
| Sorbitol | 48.75 |
| Coevaporated blend of 67.5% Lycasin hydrogenated starch hydrolysate solids, 25% glycerin and 7.5% water | 9.1 |
| Mannitol | 8.0 |
| Glycerin | 7.7 |
| Peppermint Flavor | 1.6 |
| Encapsulated Aspartame | 0.2 |
| Brown Color Dispersion | 0.05 |
| 10% Salt Solution | 0.05 |
| Lecithin | 0.15 |
| TOTAL | 100.00 |

For purposes of the following Examples, the chewing gum was rolled using a mannitol rolling compound, sheeted, scored and cut into sticks. Then, the chewing gum sticks were coated according to the following general procedure. For some of the samples used in the following Examples, one or more steps of the procedure were omitted, as will become hereinafter apparent.

Procedure:
a. Remove the rolling compound from the chewing gum sticks by wiping with a dry cloth, followed by a damp cloth. Allow the chewing gum sticks to dry.
b. Flush a Nordson hot melt wax spray applicator for 10–15 minutes using the appropriate wax.
c. Apply a coating of Methocel E5 solution (13.3% HPMC in water) to one surface of the chewing gum stick, using a Nordson airless solution sprayer. Using an air dryer with low heat (about 120° F.), dry the aqueous HPMC coating partially until it becomes tacky, and will not flow. Drying time should generally be no longer than about 30 seconds to about two minutes.
d. Apply a coating of wax over the partially dried coating of Methocel E5. Allow the wax to harden.
e. Repeat steps "a" through "d" for the opposite surface of the chewing gum sticks.

After the chewing gum sticks were coated on both sides, the coated samples (unwrapped) were stored under controlled conditions of 58% relative humidity and 85° F., for several days. The samples were weighed periodically in order to calculate the percent weight change due to moisture pickup. The results were plotted in FIGS. 1–11. In order to facilitate a clear understanding of these graphs, the comparisons made in each of the figures are discussed individually in the following Examples 1–11.

EXAMPLE 1

Referring to FIG. 1, chewing gum sticks were coated on both sides with a 0.9 mil coating of 13.3% Methocel E5 solution (measured before any drying occurred) and with various thicknesses of beeswax, the sample designated as "control" consisted of sticks of the chewing gum without any coating of HPMC or wax, which were "unprepared" (i.e., without the rolling compound removed). The remaining samples were "prepared" (i.e., the following compound was removed), were coated with aqueous HPMC, and were coated with 0.9, 1.65 and 3.0 mils of beeswax, respectively.

FIG. 1 indicates that the "control" chewing gum sample picked up more than six weight percent additional moisture from the surrounding atmosphere, over the 10-day storage period. The remaining samples, which exemplified a preferred embodiment of the invention (a preferred edible film forming agent and a preferred wax) showed at least a 30% reduction in moisture pickup, for the 10 days. The reduction in moisture pickup improved somewhat as the thickness of the beeswax increased.

EXAMPLE 2

Figure 2:
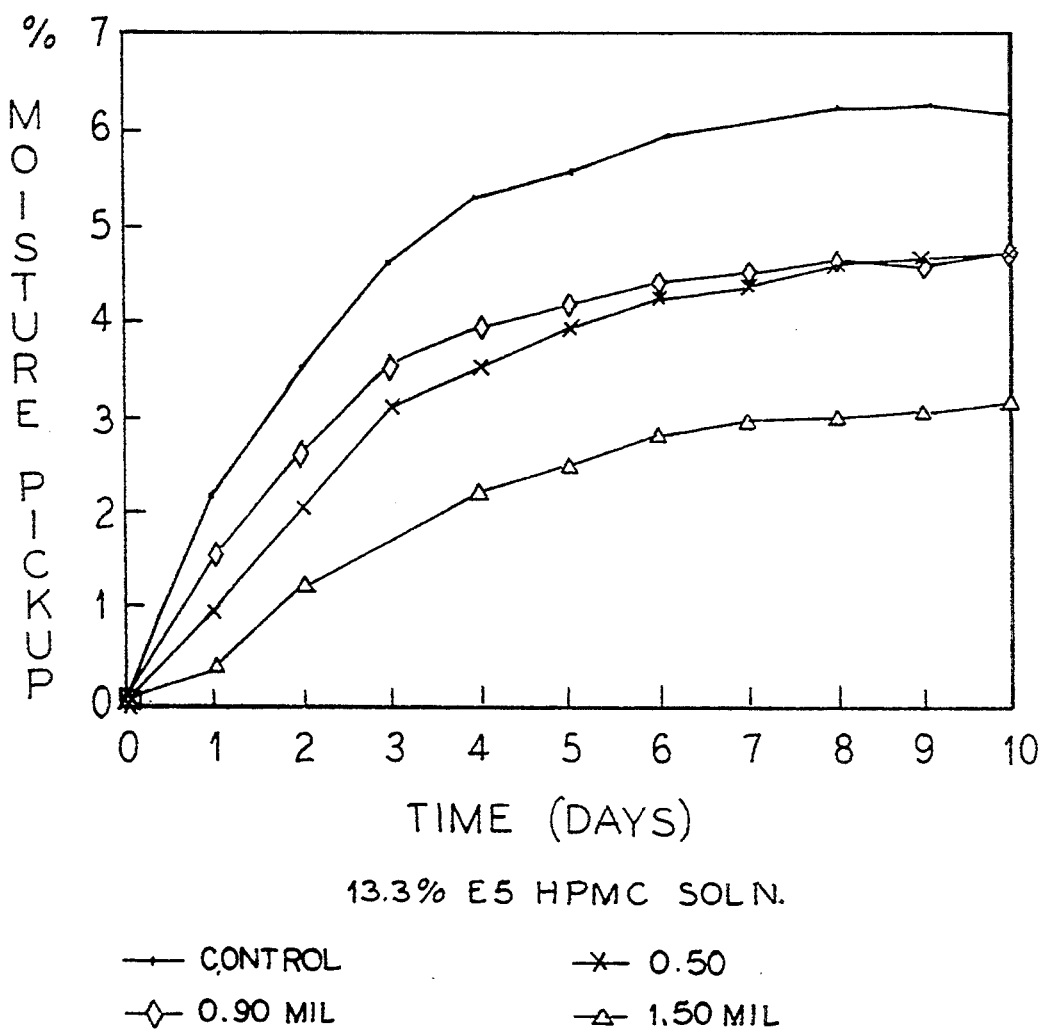
FIG. 2 illustrates the weight gain as a function of time for chewing gum sticks coated with different thicknesses (wet) of aqueous HPMC, and no wax.

Referring to FIG. 2, chewing gum sticks prepared by removing the rolling compound, and coated with various thicknesses of 13.3% Methocel E5 solution (measured before drying), but not coated with any wax, were compared to the unprepared, uncoated chewing gum control sticks. Coatings of 0.50 and 0.90 mil of Methocel E5 solution (measured before drying) resulted in about a 25% reduction in moisture pickup over the 10-day period, compared with the control. A coating of 1.50 mils of Methocel E5 solution caused further improvement, resulting in a reduction in moisture pickup of more than 50%, compared with the control.

EXAMPLE 3

Figure 3:
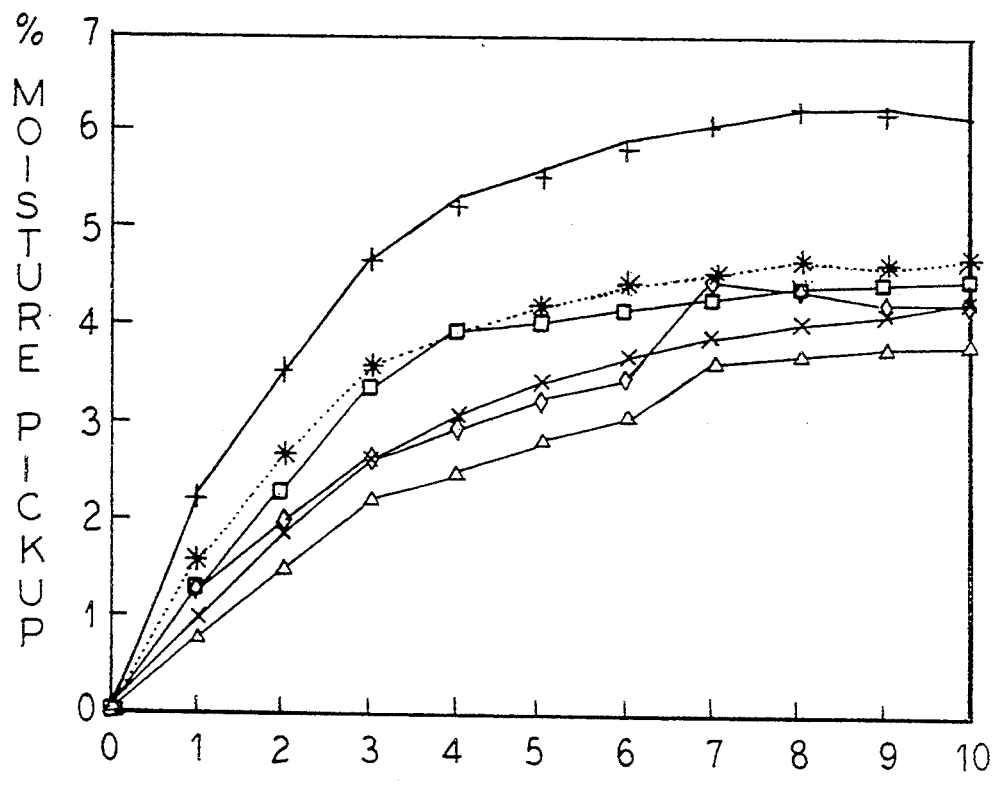
FIG. 3 illustrates the weight gain as a function of time for chewing gum sticks coated on both sides with 0.9 mils (wet) of aqueous HPMC and beeswax, for different thicknesses of beeswax and for no wax.

Referring to FIG. 3, the sample called "Control 1" refers to the chewing gum sticks, which were uncoated and unprepared (i.e., with the rolling compound intact). The sample called "Control 2" refers to the uncoated chewing gum sticks, which were "prepared" by removing the rolling compound. The sample called "Control 3" refers to prepared chewing gum sticks, coated on both sides with 0.9 mil of 13.3% Methocel E5 solution (measured before drying) but not coated with any wax. The remaining sample consisted of prepared chewing gum sticks coated with 0.9 mil of Methocel E5 solution (measured before drying) and further coated with 0.9, 1.65, 2.0 and 3.0 mils, respectively, of beeswax.

Control 1 and Control 2 both picked up more than 6% by weight additional moisture in 10 days, indicating that removal of the rolling compound had no significant effect on moisture pickup. Control 3 picked up about 4.7% by weight additional moisture, indicating significant improvement resulting from the coating with HPMC alone. The remaining samples showed further reduction of moisture pickup resulting from coating with beeswax in addition to HPMC, with the reduction being more pronounced as the thickness of beeswax was increased.

EXAMPLE 4

Figure 4:
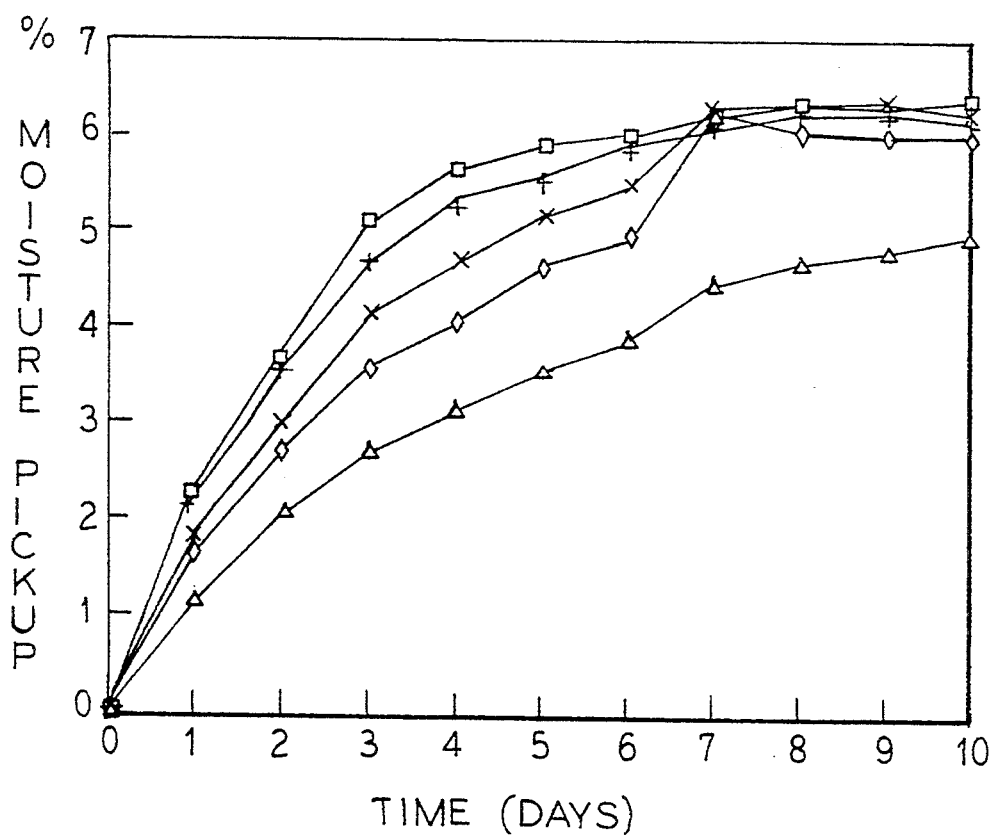
FIG. 4 illustrates the weight gain as a function of time for chewing gum sticks coated with different thicknesses of beeswax only, and no HPMC

Referring to FIG. 4, the samples called "Control 1" and "Control 2" are the same as described above in Example 3. The remaining samples were prepared chewing gum sticks coated with 0.9, 1.65, 2.0 and 3.0 mils, respectively, of beeswax, but not coated with HPMC. While the beeswax alone caused some reduction in moisture pickup, particularly at 3.0 mils, the reduction was much less than when the chewing gum sticks were coated with HPMC and beeswax. This can be seen by comparing FIG. 4 and FIG. 3.

EXAMPLE 5

Figure 5:
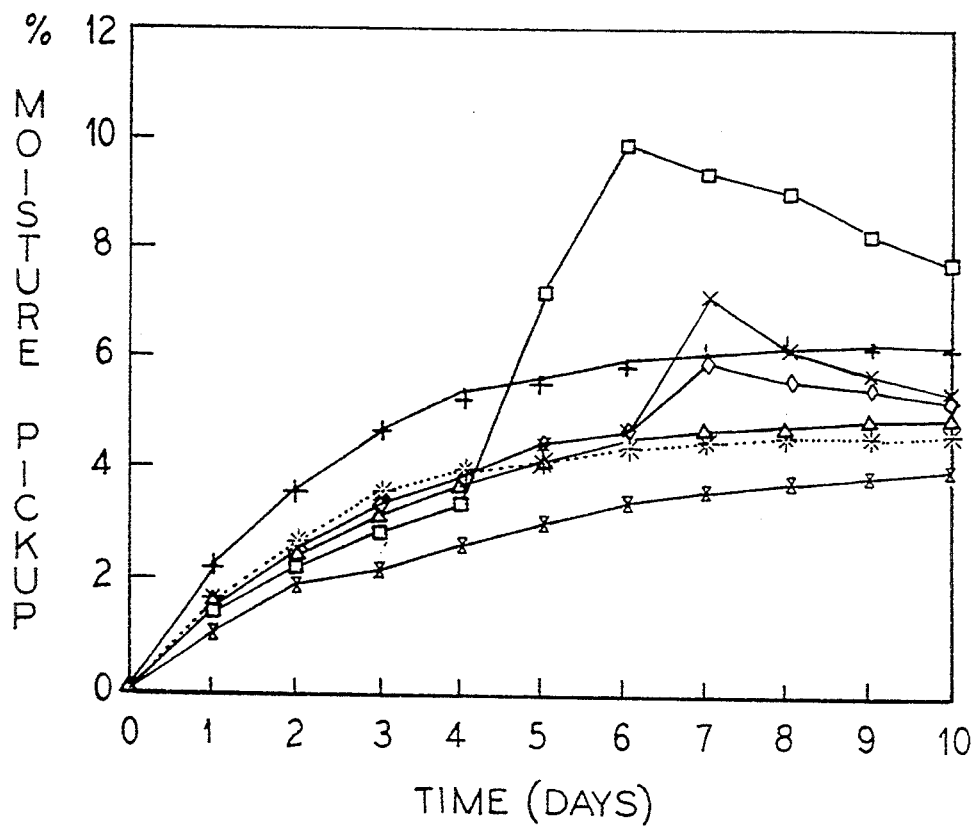
FIG. 5 illustrates the weight gain as a function of time for chewing gum sticks coated on both sides with 0.9 mils (wet) of aqueous HPMC and Victory (microcrystalline) wax, for different thicknesses of Victory wax and for no wax.

Referring to FIG. 5, the samples called "Control 1," "Control 2" and "Control 3" are the same as described above in Example 3. The remaining samples were prepared chewing gum sticks coated with 0.9 mil of 13.3% Methocel E5 solution (measured before drying) and further coated with 0.45, 1.1, 1.65, 2.0 and 3.0 mils, respectively, of Victory wax. Victory wax is a synthetic microcrystalline wax available from the Petrolite Company in Tulsa, Okla., and is softer than beeswax.

Comparison of the wax-coated samples with Controls 1 and 2 indicates that the samples with wax coatings of 1.1 mils and above (in addition to HPMC) showed reduced moisture pickup after 10 days, compared with the uncoated chewing gum sticks. The sample with a wax coating of 0.45 mils did not show a consistent or overall improvement in moisture pickup. Comparison of the wax-coated samples with Control 3 indicates that only the thickest of the wax coatings, 3.0 mils, showed further reduction in moisture pickup compared with the chewing gum sticks coated with HPMC and no wax.

EXAMPLE 6

Figure 6:
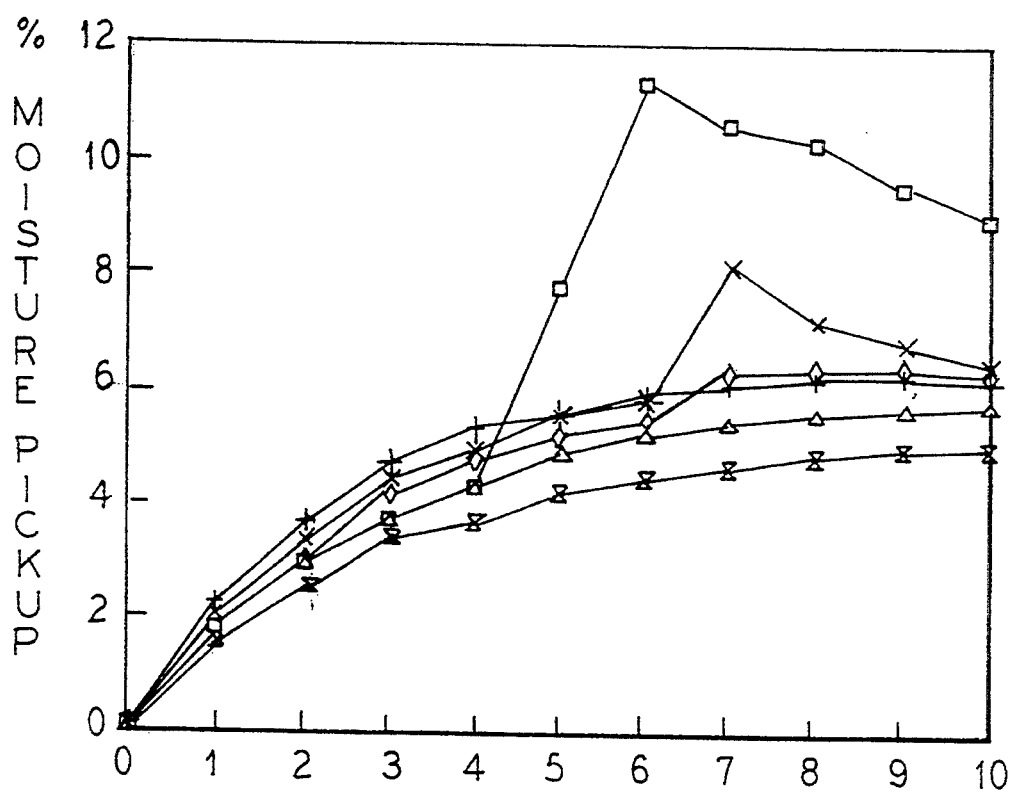
FIG. 6 illustrates the weight gain as a function of time for chewing gum sticks coated with different thicknesses of Victory wax only, and no HPMC.

Referring to FIG. 6, the samples called "Control 1" and "Control 2" are the same as described above in Example 3. The remaining samples were prepared chewing gum sticks coated with 0.45, 1.1, 1.65, 2.0 and 3.0 mils, respectively, of Victory wax, but not coated with HPMC. Only the thickest of wax coatings, 2.0 and 3.0 mils, showed consistent reductions in moisture pickup compared to the uncoated chewing gum controls.

EXAMPLE 7

Figure 7:
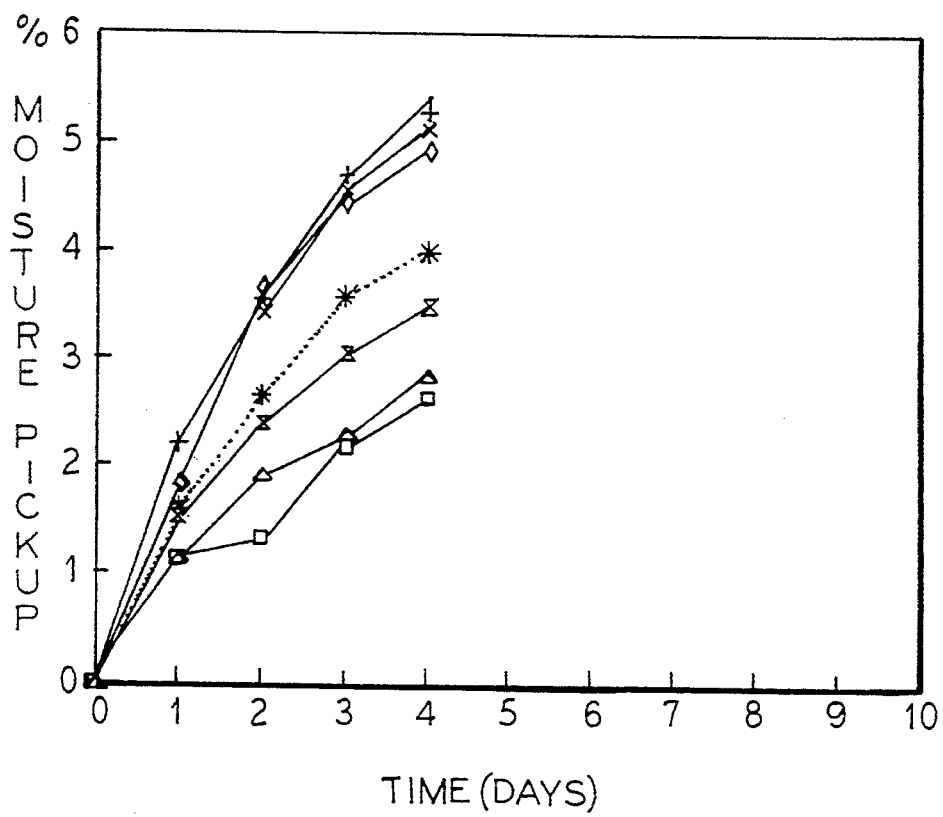
FIG. 7 illustrates the weight gain as a function of time for chewing gum sticks coated on both sides with 0.9 mils (wet) of aqueous HPMC and Besquare 185 (microcrystalline) wax, for different thicknesses of Besquare 185 wax and for no wax.

Referring to FIG. 7, the samples called "Control 1," "Control 2" and "Control 3" are the same as described above in Example 3. The remaining samples were prepared chewing gum sticks coated with 0.9 mil of 13.3% Methocel E5 solution (measured before drying) and further coated with 0.65, 1.1, 1.65, 2.1 and 3.1 mils, respectively, of Besquare 185 wax. Besquare 185 is a synthetic microcrystalline wax available from the Petrolite Co. in Tulsa, Okla. Besquare 185 is harder and more crystalline than Victory wax and has a less branched, more linear molecular structure.

Comparison of the wax-coated samples with Controls 1 and 2 indicates that, in general, the samples with wax coatings in addition to HPMC showed, reduced moisture pickup after four days, compared with the uncoated chewing gum sticks.

EXAMPLE 8

Figure 8:
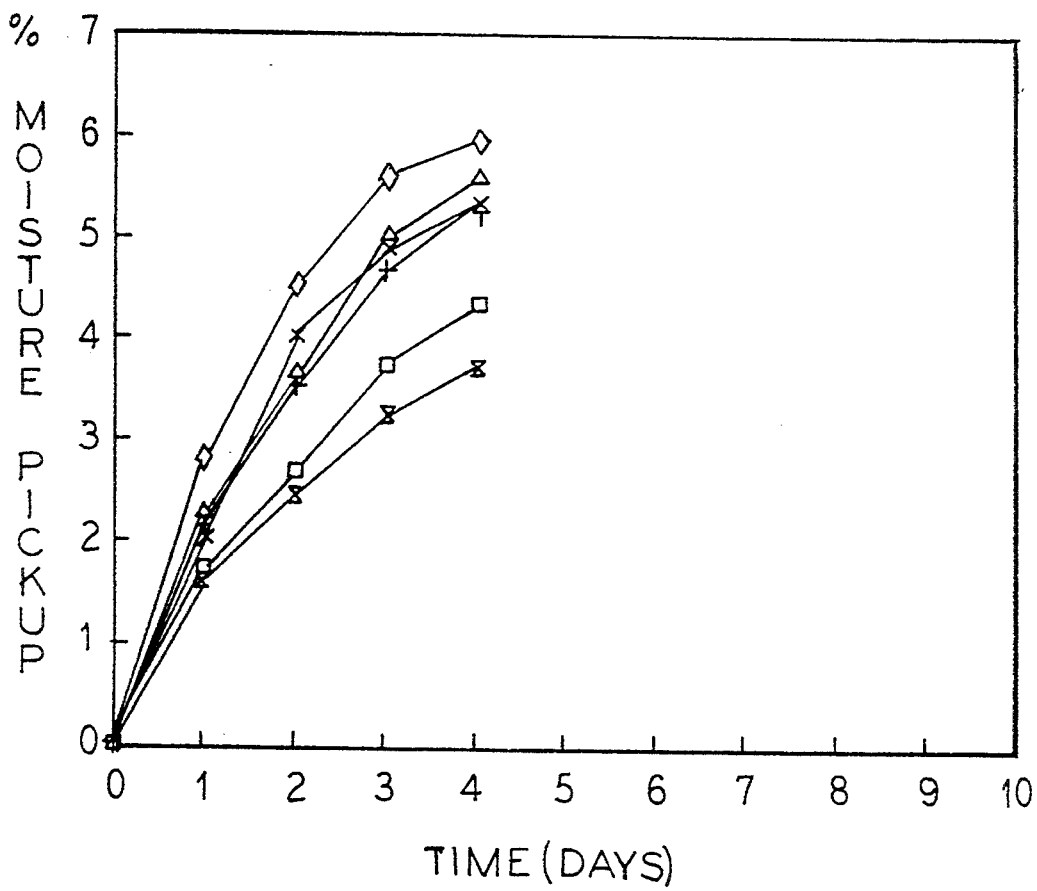
FIG. 8 illustrates the weight gain as a function of time for chewing gum sticks coated with different thicknesses of Besquare 185 wax only, and no HPMC.

Referring to FIG. 8, the samples called "Control 1" and "Control 2" are the same as described above in Example 3. The remaining samples were prepared chewing gum sticks coated with 0.65, 1.1, 1.65, 2.1 and 3.1 mils, respectively, of Besquare 185 wax, but not coated with HPMC.

Some of the wax-coated samples showed reduced moisture pickup compared with the uncoated chewing gum sticks, while others did not. There was no recognizable correlation between the thickness of the wax coating and the amount of moisture pickup, possibly due to cracking of the relatively hard wax.

EXAMPLE 9

Figure 9:
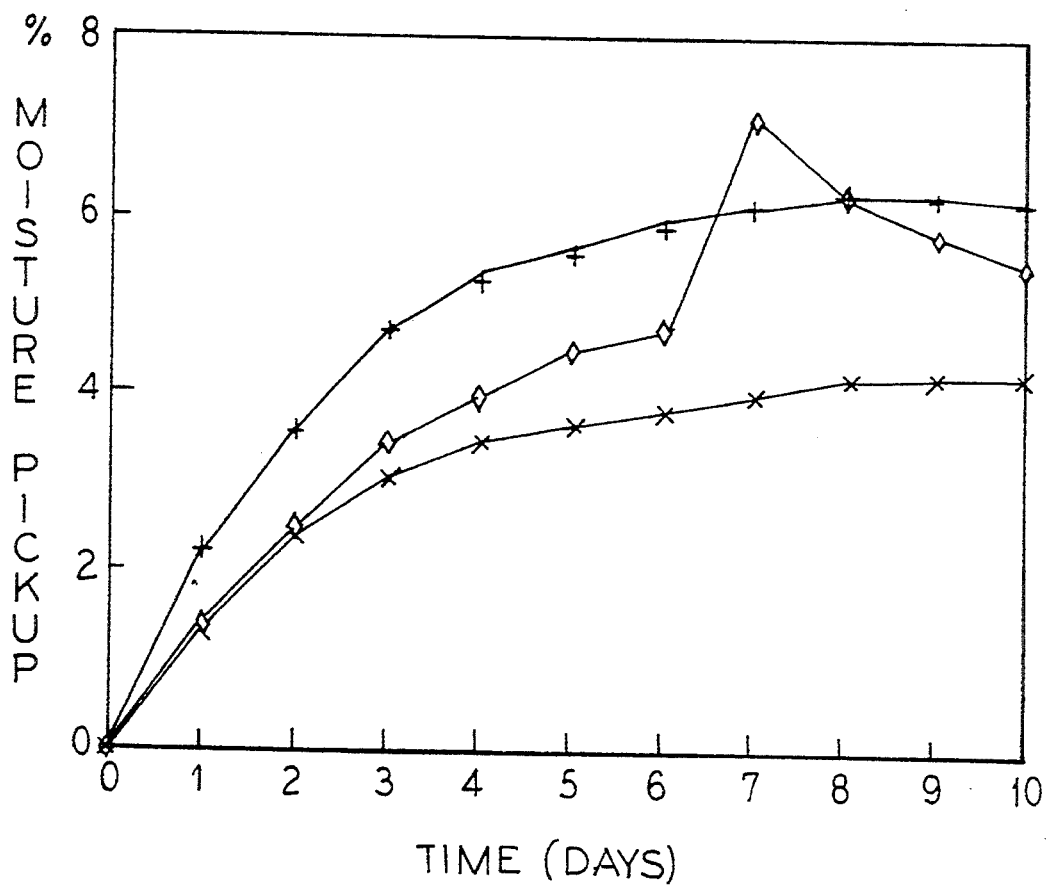
FIG. 9 illustrates the weight gain as a function of time for chewing gum sticks coated with HPMC and Victory wax after the rolling compound has been removed (prepared sample) compared with chewing gum sticks coated with HPMC and Victory wax without removing the rolling compound (unprepared sample).

Referring to FIG. 9, the samples called "Control 1" and "Control 2" are the same as described above in Example 3. One of the remaining samples consisted of prepared chewing gum sticks coated with 0.9 mils of 13.3% Methocel E5 solution (measured before drying) and 1.1 mils of Victory wax. The other of the remaining samples consisted of unprepared chewing gum sticks coated with 1.1 mils of Methocel E5 solution and 1.1 mils of Victory wax.

From the data, it cannot be said that the prepared chewing gum sticks coated with HPMC and wax, absorbed less additional moisture than the unprepared chewing gum sticks, coated with HPMC and wax. Both coated samples showed reduced moisture pickup compared to the uncoated chewing gums sticks.

EXAMPLE 10

Figure 10:
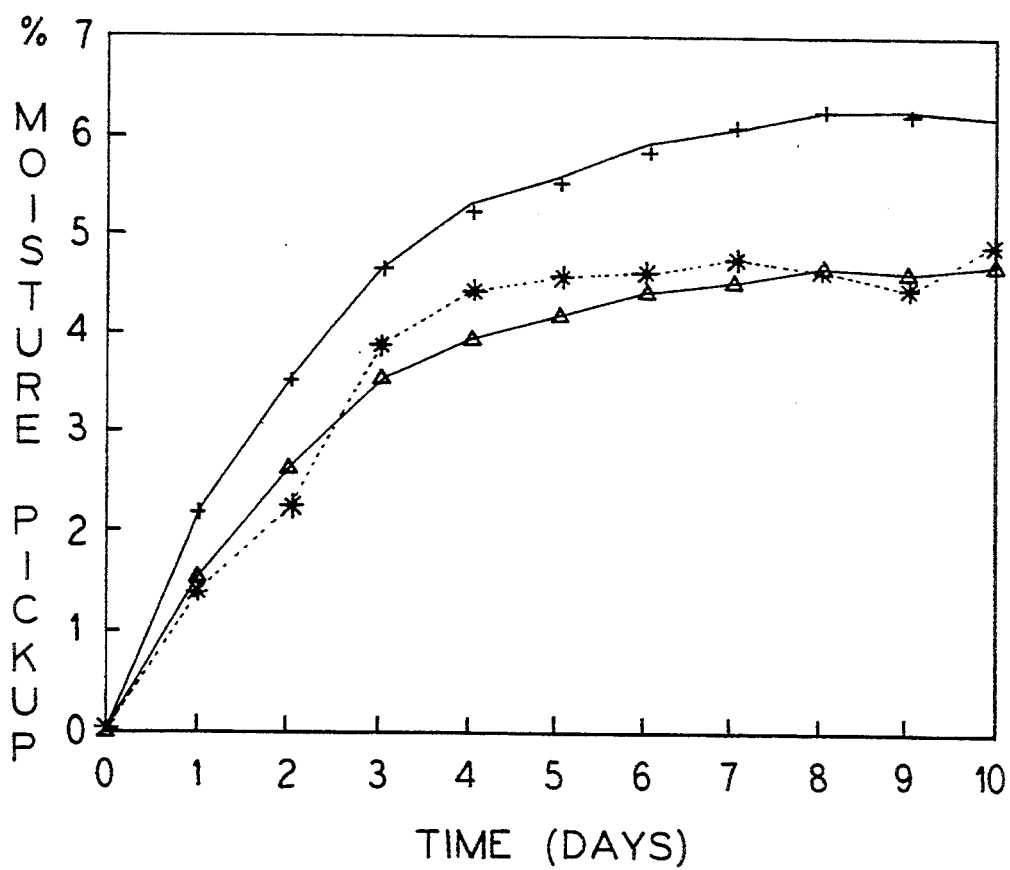
FIG. 10 illustrates the weight gain as a function of time for chewing gum sticks coated with HPMC only, after the rolling compound has been removed (prepared sample) and without removing the rolling compound (unprepared sample).

Referring to FIG. 10, the samples called "Control 1" and "Control 2" are the same as described above in Example 3. One of the remaining samples consisted of prepared chewing gum sticks coated with 0.9 mils of 13.3% Methocel E5 solution (measured before drying) but not coated with wax. The other of the remaining samples consisted of unprepared chewing gum sticks coated with 1.1 mils of Methocel E5 solution, but not coated with wax.

Again, whether or not the dusting compound was removed prior to coating, made no difference in the performance of the samples coated with HPMC. Both coated samples showed reduced moisture pickup compared to the uncoated chewing gum sticks.

EXAMPLE 11

Figure 11:
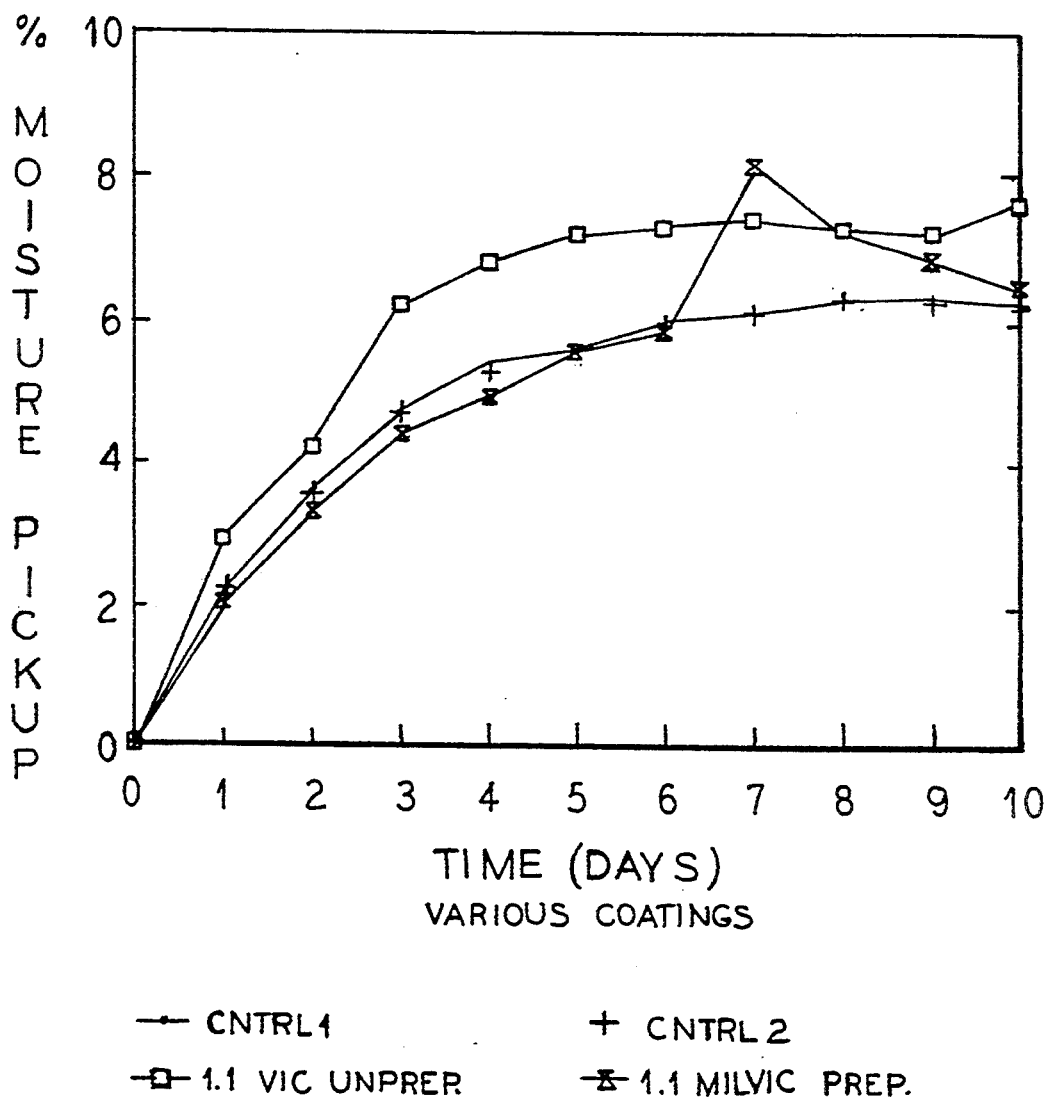
FIG. 11 illustrates the weight gain as a function of time for chewing gum sticks coated with Victory wax only, after the rolling compound has been removed (prepared sample) and without removing the rolling compound (unprepared sample).

Referring to FIG. 11, the samples called "Control 1" and "Control 2" are the same as described above in Example 3. The remaining samples consist of prepared and unprepared chewing gum sticks coated with 1.1 mils of Victory wax but no HPMC.

Neither of the samples coated with Victory wax, but not HPMC, showed a reduction in moisture pickup compared to the uncoated chewing gum sticks.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A stick of chewing gum comprising:
   a gum body in the shape of a stick
   a coating of an edible film that coats the stick of chewing gum, the edible film includes at least one material chosen from the group consisting of: cellulose derivatives; modified starch; maltodextrin; polyols; low calorie bulking agents; dextrin; gelatin; zein; soy proteins; gluten; whey proteins; vegetable gums; edible polymers; edible plastics; shellac; carbohydrates; modified carbohydrates; carbohydrate derivatives; proteins; lipids; pseudolatexes; colloidal dispersion; ethylcellulose emulsion; wax emulsions; and combinations thereof, the coating of edible film having sufficient barrier properties to provide the chewing gum with increased moisture stability at ambient conditions than a chewing gum without the coating of edible film, the edible film including at least one active chewing gum agent.

2. The stick of chewing gum of claim 1 wherein the active chewing gum agent is a sweetener.

3. The stick of chewing gum of claim 1 wherein the active chewing gum agent is a flavor.

4. The stick of chewing gum of claim 1 wherein the active chewing gum agent is a dental agent.

5. The stick of chewing gum of claim 1 wherein the active chewing gum agent is a softener.

6. The stick of chewing gum of claim 1 wherein the active chewing gum agent Is a flavor enhancer.

7. The stick of chewing gum of claim 1 wherein the active chewing gum agent is water.

8. The stick of chewing gum of claim 1 wherein the active chewing gum agent is a slip agent.

9. The stick of chewing gum of claim 1 wherein the active agent is an antioxidant.

10. The stick of chewing gum of claim 1 wherein the active chewing gum agent is a color.

11. The stick of chewing gum of claim 1 wherein the chewing gum is a stick gum including a first side and a second side and the edible film is applied to both sides.

12. The stick of chewing gum of claim 1 wherein the coating of edible material includes an edible film forming agent chosen from the group consisting of: cellulose derivatives; modified starch; maltodextrin; polyols; low calorie bulking agents; dextrin; gelatin; zein; soy proteins; gluten; whey proteins; vegetable gums; edible polymers; edible plastics; shellac; and combinations thereof.

13. The stick of chewing gum of claim 1 wherein the coating of edible material comprises:
    a first layer of an edible film; and
    a second layer of at least one material chosen from the group consisting of: wax, hydrocarbon polymer type waxes, fatty acids, fats, oils, and lipid derivatives.

14. The stick of chewing gum of claim 1 wherein the coating of edible material is an emulsion including at least two materials chosen from the group consisting of: carbohydrates; modified carbohydrates; carbohydrate derivatives; proteins; and lipids.

15. The stick of chewing gum of claim 1 wherein the coating of edible material includes an emulsion chosen from the group consisting of: pseudolatexes; colloidal dispersions; ethylcellulose emulsion; and wax emulsions.

16. A stick chewing gum comprising:
    a gum body in the shape of a stick that includes an insoluble gum base and a water soluble portion;
    a coating of an edible film that coats the surface of the gum body, the edible film includes at least one material chosen from the group consisting of: cellulose derivatives; modified starch; maltodextrin; polyols; low calorie bulking agents; dextrin; gelatin; zein; soy proteins; gluten; whey proteins; vegetable gums; edible polymers; edible plastics; shellac; carbohydrates; modified carbohydrates; carbohydrate derivatives; proteins; lipids; pseudolatexes; colloidal dispersion; ethylcellulose emulsion; wax emulsions; and combinations thereof, the coating of edible film coats at least a substantial portion of the gum body and provides sufficient barrier properties to the gum body to provide the stick chewing gum with increased moisture stability at ambient conditions than a chewing gum without the edible film; and at least one active agent chosen from the group consisting of: sweeteners; flavor; dental agents; softeners; antioxidants; flavor enhancers; water; colors; and slip agents, that is located within the coating of edible film.

17. The stick chewing gum of claim 16 wherein the sweetener is chosen from the group consisting of: Aspartame; alitame; sucralose; salts of acesulfame; saccharine and its salts; cyclamic acid and its salts; glycyrrhizin; dihydrochalcones; thaumatin; and combinations thereof.

18. The stick chewing gum of claim 16 wherein the flavor is chosen from the group consisting of: citrus oils, light fruit esters, mint oils, clove oil, oil of wintergreen, anise, and artificial flavors.

19. The stick chewing gum of claim 16 wherein the dental agent is chosen from the group consisting of: plaque pH buffers, phosphates, minerals, urea, sodium bicarbonate, calcium glycerophosphate, and remineralizing agents.

20. The stick chewing gum of claim 16 wherein the softener is chosen from the group consisting of: lecithin, glycerol monostearate, triacetin, acetylated monoglycerides, polyol esters, polyglycol esters, fats, oils, and other lipids.

21. The stick chewing gum of claim 16 wherein the slip agent is chosen from the group consisting of: silicones, stearates, high melting point waxes, silicon dioxide, talc, and polymer slip agents.

22. The stick chewing gum of claim 16 wherein the color is chosen from the group consisting of: dyes, lakes, pigments, whitenets, and natural food colorants.

23. A method for manufacturing chewing gum comprising the steps of:

creating a unit of chewing gum in the form of a stick;

coating a surface of the unit of chewing gum with an edible film that includes at least one material chosen from the group consisting of: cellulose derivatives; modified starch; maltodextrin; polyols; low calorie bulking agents; dextrin; gelatin; zein; soy proteins; gluten; whey proteins; vegetable gums; edible polymers; edible plastics; shellac; carbohydrates; modified carbohydrates; carbohydrate derivatives; proteins; lipids; pseudolatexes; colloidal dispersion; ethylcellulose emulsion; wax emulsions; and combinations thereof, the coating of edible film providing barrier properties; and locating in the coating of edible film at least one active chewing gum agent chosen from the group consisting of: sweeteners; flavor; antioxidants; dental agents; softeners; flavor enhancers; water; colors; and slip agents.

24. The method of claim 23 wherein the unit is a stick of gum.

25. The method of claim 23 wherein the stick of chewing gum includes a first and second side and the first and second sides are both coated with the edible film.

26. The method of claim 23 wherein the active agent is present in the film on only a first or a second side of the chewing gum stick.

27. A method for segregating in a chewing gum ingredients comprising the steps of:

creating a chewing gum structure that has a stick shape; and coating a surface of the chewing gum structure with a coating of an edible film that includes one or more ingredients that interact with one or more ingredients located in the chewing gum structure, the edible film also including at least one material chosen from the group consisting of: cellulose derivatives; modified starch; maltodextrin; polyols; low calorie bulking agents; dextrin; gelatin; zein; soy proteins; gluten; whey proteins; vegetable gums; edible polymers; edible plastics; shellac; carbohydrates; modified carbohydrates; carbohydrate derivatives; proteins; lipids; pseudolatexes; colloidal dispersion; ethylcellulose emulsion; wax emulsions; and combinations thereof.

28. A method for providing improved processability to a chewing gum composition comprising the steps of:

creating a unit of chewing gum having a stick shape; and coating a surface of the stick shape with a coating of edible film that includes a slip agent and least one material chosen from the group consisting of: cellulose derivatives; modified starch; maltodextrin; polyols; low calorie bulking agents; dextrin; gelatin; zein; soy proteins; gluten; whey proteins; vegetable gums; edible polymers; edible plastics; shellac; carbohydrates; modified carbohydrates; carbohydrate derivatives; proteins; lipids; pseudolatexes; colloidal dispersion; ethylcellulose emulsion; wax emulsions; and combinations thereof.

29. The method for providing of claim 28 wherein the slip agent is chosen from the group consisting of: silicones, stearates, high melting point waxes, silicon dioxide, talc, and polymer slip agents.

* * * * *